United States Patent

[11] 3,566,093

[72] Inventors Thomas F. Joyce Melrose; John J. Bradley, Framingham; Richard A. Lemay, Marlboro, Mass.

[21] Appl. No. 717,267

[22] Filed Mar. 29, 1968

[45] Patented Feb. 23, 1971

[73] Assignee Honeywell Inc. Minneapolis, Minn.

[54] DIAGNOSTIC METHOD AND IMPLEMENTATION FOR DATA PROCESSORS
12 Claims, 2 Drawing Figs.

[52] U.S. Cl. ........................................................ 235/153, 340/146.1

[51] Int. Cl. ........................................................ G11c 29/00; G06f 11/08

[50] Field of Search ............................................ 340/146.1; 235/153

[56] References Cited

UNITED STATES PATENTS

| | | | |
|---|---|---|---|
| 3,221,310 | 11/1965 | Reach, Jr. .................... | 340/146.1X |
| 3,222,653 | 12/1965 | Rice .......................... | 340/146.1X |
| 3,398,400 | 8/1968 | Rupp et al. .................. | 340/146.1 |
| 3,350,690 | 10/1967 | Rice .......................... | 340/146.1X |
| 3,427,443 | 2/1969 | Apple et al. .................. | 235/153 |

*Primary Examiner*—Malcolm A. Morrison
*Assistant Examiner*—Charles E. Atkinson
*Attorneys*—Fred Jacob and Leo Stanger

ABSTRACT: The addition of means for selectively complementing parity signals provides a way of flagging selected words or locations in a memory of an electronic data processor. The parity error signal can then be used in diagnostic routines for signaling erroneous access to a memory location or to provide a distinctive synchronization signal for test equipment while the memory is cycled through a loop including locations under test.

John J. Bradley
Thomas F. Joyce
Richard A. Lemay
Inventors

John J. Bradley
Thomas F. Joyce
Richard A. Lemay
Inventors

DIAGNOSTIC METHOD AND IMPLEMENTATION FOR DATA PROCESSORS

BACKGROUND OF THE INVENTION

Among the many possibilities that produce problems in the operation of a computer, two significant ones are faulty programming and errors due to hardware malfunction. When a program produces erroneous results, it is frequently possible to trace the difficulty to a particular word or a particular memory location. This is not a complete answer however. It is still necessary to determine what the program is doing with respect to this particular work or location that is causing the trouble. Frequently, this is the only way to tell whether the difficulty is due to hardware or software.

One usual way of handling this in the past has been to provide a diagnostic register of memory word size along with comparator logic. In a diagnostic routine this register and associated logic can be used to provide a signal whenever a specific location is addressed. The address of the problem location is manually inserted into the diagnostic register then a comparison is made between this and each address applied to the memory during a program run. Each true comparison is signaled. Similarly a memory word can be entered into the diagnostic register and a comparison can be made with each word accessed in memory. This works very well but is costly in terms of hardware.

Another diagnostic difficulty is encountered in the use of test equipment. When a source of error has been traced to hardware associated with a specific sequence of memory words, it is very useful to be able to observe signals at particular circuit points while the memory is repetitively cycled through a few locations. In using an oscilloscope for this purpose, it is necessary to provide some signal for synchronizing the oscilloscope sweep with respect to a specific portion of the cycle for observation. Frequently, no distinct signal is available for this purpose since most of the signals occurring at the desired times are obscured by other signals.

SUMMARY OF THE INVENTION

Recognizing that parity signals in a computer are at some points separated and handled by distinct circuitry, the present invention makes use of this circuitry and the parity signals to provide memory word "flags" as well as test synchronization signals. By adding an inverter to the output of the parity generator and a switch for selectively operating the inverter, the invention provides a "flag" to selected words entered into memory by means of faulty parity. The conventional parity checker can then signal that word each time it is accessed. Test synchronization is made available in the same way with the further addition of simple gating or switching circuitry to select whether a faulty parity bit will halt operation or only provide an output signal to an output signal terminal for test synchronization connection.

Thus, it is an object of the invention to provide means to invert parity of selected words at the input of a computer memory.

A further object of the invention is to provide means of selectively flagging words entered into a computer memory by complementing the associated parity.

A further object of the invention is to provide means to selectively signal false parity on any access to a computer memory location containing a word with false parity.

A further object of the invention is to provide a parity checker associated with a memory of an electronic data processing system with means to signal parity error when encountered during one of the following selectable conditions:

a. only during read, b. only during write new data, c. upon any access to location.

A further object of the invention is to provide means for alternatively halting operation of a data processor or providing an output signal pulse upon encountering false parity.

Still a further object of the invention is to define a diagnostic method for electronic data processing systems using complemented parity bits.

Further objects and features of the invention will be understood upon reading the following description together with the drawings.

DESCRIPTION OF THE PREFERRED EMBODIMENTS

The value of the present invention arises partly from the fact that most of the required implementation already exists in prior art electronic data processors.

Figure 1:
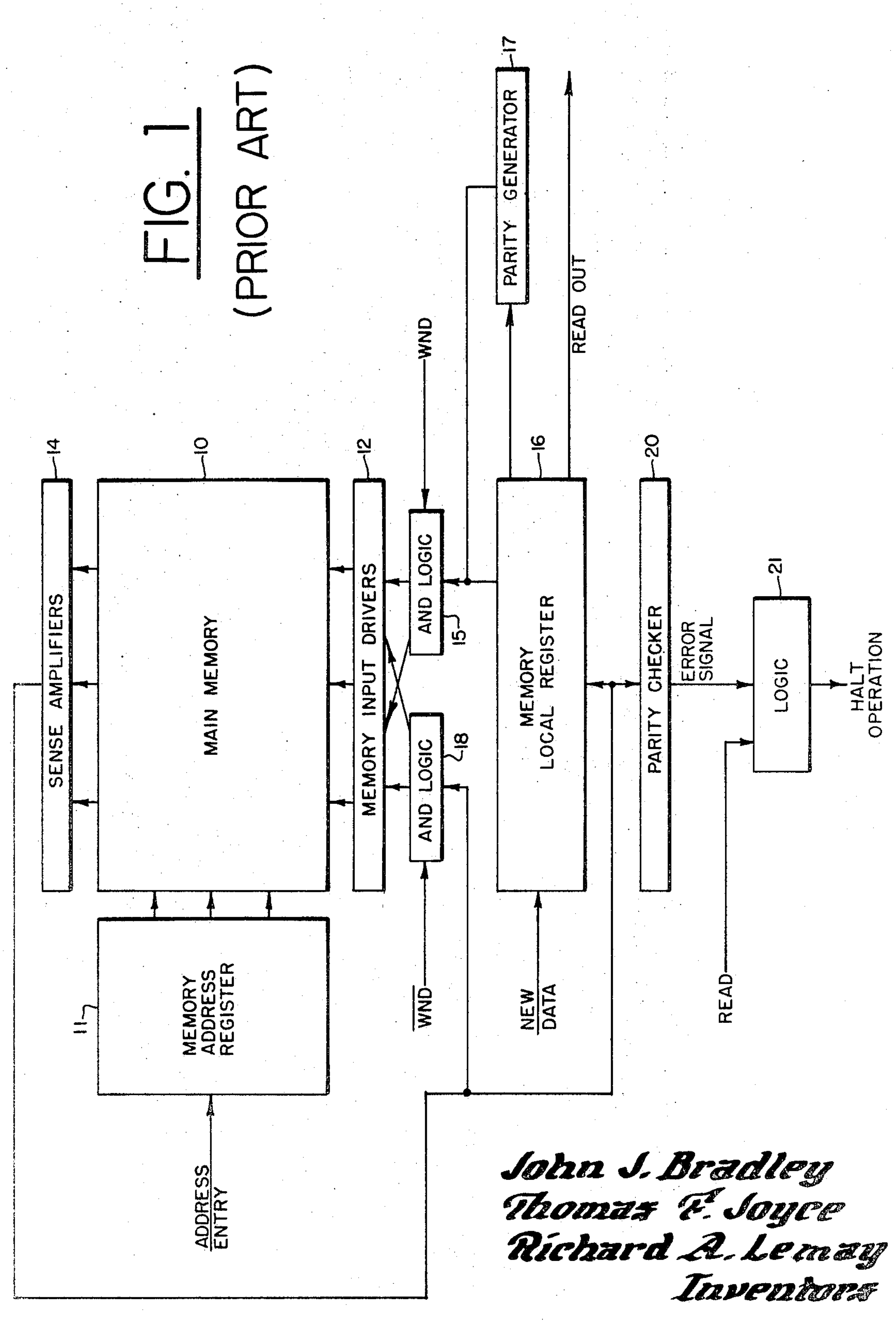
FIG. 1 (PRIOR ART)
FIG. 1 is a simplified block diagram of the memory system in a prior art data processing system.

FIG. 1 depicts a conventional memory system with its input and output implementation. Main Memory 10 is, for example, a rectangular matrix array of magnetic core storage elements. Sets of these elements are selected for access by Memory Address Register 11 which is connected to address lines of the matrix. Data is written into an addressed set of cores by connection of Memory Input Drivers 12 to the "write" lines of the matrix. Data is read out of an addressed set of cores by connection of Sense Amplifiers 14 to the "sense" lines of the matrix.

AND Logic 15 is a series of AND gates connecting Memory Local Register 16 and Parity Generator 17 to Memory Input Drivers 12. A Write New Data (WND) control signal is connected as a control input to AND Logic 15. AND Logic 18 is a series of AND gates connecting the output of Sense Amplifiers 14 to Memory Input Drivers 12. A "Not" Write New Data (WND) control signal is connected as a control input to AND Logic 18.

Memory Local Register 16 has input connections both from Sense Amplifiers 14 and from a New Data input channel. Besides an output connection to AND Logic 15, Register 16 also has an output connection to Parity Generator 17 and to a Readout channel.

Parity checker 20 is connected between Sense Amplifiers 14 and Logic Circuits 21 which halt the operation on detection of a faulty parity. A Read control input to Logic circuits 21 enables this circuit only during Read. The implementation with which Logic Circuits 21 halt operation can take many forms. For example, Memory 10 commonly operates in a cyclical manner under the control of pulses from a clock. By inhibiting these pulses, Logic Circuits 21 will halt operation of the system upon a parity error signal.

In operation, Parity Generator 17 establishes the parity of New Data and supplies the parity bit along with the New Data to Input Drivers 12. During Read, the old data is restored to Memory 10 through AND Logic 18 bypassing Register 16 and Generator 17. Also during Read, Parity Checker 20 checks the parity of the word being read and halts processing if a parity error appears. While Parity Checker 20 checks parity in every location addressed in either Read or Write, the error output is inhibited during Write New Data since the correctness of parity in the old data is of no interest and would only interfere with operation.

Figure 2:
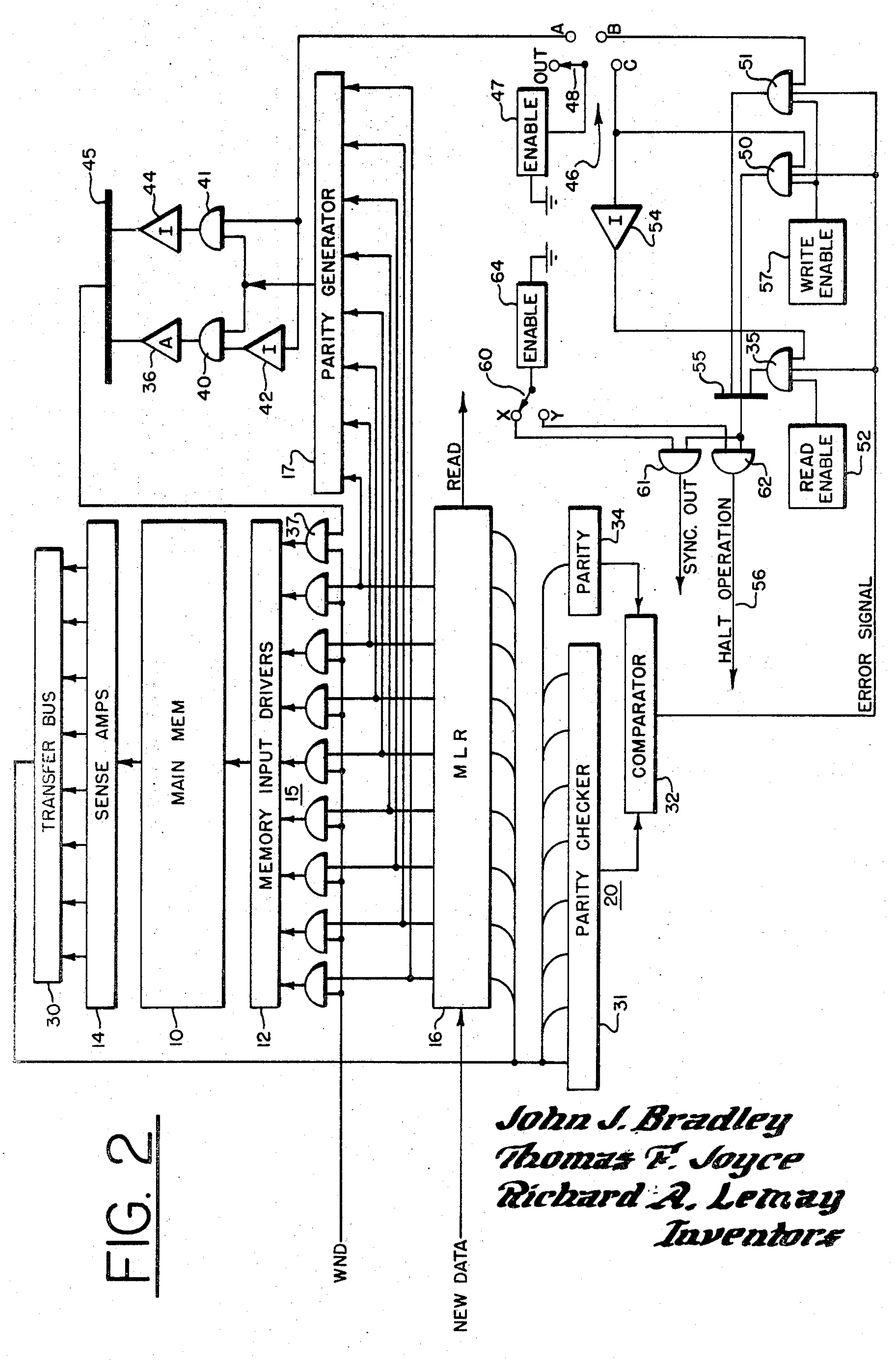
FIG. 2 is a block diagram detailing relevant portions of FIG. 1 in accordance with the invention.

FIG. 2 depicts only portions of FIG. 1, but with greater detail where relevant to the invention. The same designation numerals are used where applicable. The Memory System in FIG. 2 is depicted as using eight-bit words with a ninth bit for parity.

The output of Sense Amplifiers 14 is depicted as connected through a Transfer Bus 30 to Memory Local Register 16 and Parity Checker 20. Bus 30 is only intended to infer that a plurality of leads are being handled together.

AND Logic 15 is detailed to show nine AND gates for eight bits plus parity. Parity Checker 20 is detailed to show Comparator 31 that compares the modulo 2 sum of the data bits from Adder 31 with the parity bit from register 34. As with FIG. 1, an error signal during Read is passed by a gate 35 to halt operation.

Parity Generator 17 is shown with input connections detailed to show the eight inputs for the respective bits of New Data words. Parity Generator 17 performs a modulo 2 summation of the data bits and then provides a O or 1 output as required to the ninth AND gate of AND Logic 15 so that the modulo 2 sum of the full nine bits is consistently Even. In some systems odd parity is used in which case this sum is made to be consistently Odd.

The output of Parity Generator 17 is ordinarily connected through amplifier 36 to parity AND gate 37. Gate 37 is connected to Memory Input Drivers 12 for supplying the parity bit, during "Write New Data." In the embodiment of FIG. 2, one aspect of the invention is implemented by two additional AND gates 40 and 41, two inverter-amplifiers 42 and 44, one OR gate 45 and one switch 46. AND gates 40 and 41 are each connected to the output of Parity Generator 17. AND gate 40 has a second input from terminal A of diagnostic switch 46 connected through inverter-amplifier 42. AND gate 41 has a second input connected directly from terminal A of switch 46. Gate 40 is connected through amplifier 36 to one input terminal of OR gate 45. Gate 41 is connected through inverter-amplifier 44 to a second input terminal of OR gate 45. The output terminal of OR gate 45 is in turn connected to one input terminal of parity AND gate 37.

Terminal A is selectively connected to an "enable" reference source 47 by movable switch arm 48. Depending on the operating bias sources applied to the different gates, enable source 47 can be a zero reference (ground).

The aspect of the invention described in the above embodiment is selective complementing of the parity bit. When switch arm 48 is not connected to switch terminal A, gate 40 is enabled due to operation of inverter-amplifier 42 while gate 41 is inhibited. Under this condition parity bits from generator 17 pass through gate 40 amplifier 36, and gate 45 to gate 37 without change.

With switch arm 48 connected to terminal A, gate 41 is enabled while gate 40 is inhibited. This connects a parity bit from generator 17 to inverter 44 where it is complemented before passing through gate 45 to gate 37.

A second aspect of the invention is implemented in the embodiment of FIG. 2 by connecting the "error signal" output of comparator 32 as an input connection to each of AND gates 35, 50 and 51.

AND gate 35 has two additional input terminals—one connected to the Read Enable control 52 and one connected to terminal C of switch 46. The connection from switch 46 is through inverter-amplifier 54 so that gate 34 is enabled during a Read Enable signal if switch arm 48 is not connected to terminal C. The output of gate 35 is connected to a first input terminal of three-input OR gate 55 which in turn is connected at its output to Halt Operation terminal 56.

AND gate 50 likewise has two additional input terminals—one connected to Write Enable control 57 and the other directly to terminal C of switch 46. The output of gate 50 is connected to a second input terminal of OR gate 55. Thus, gate 50 is enabled to pass a parity error signal to terminal 56 during a Write Enable control signal when switch 46 is in position C.

AND gate 51 also has two additional input terminals connected to Write Enable control 57 and terminal B of switch 46 respectively. The output of gate 51 is connected to the third input terminal of gate 55.

In the embodiment of FIG. 2, this second aspect of the invention is implemented for considerable flexibility. The significant benefits of this aspect of the invention do not require the additional flexibility provided by gate 51 and position B of switch 46.

Operation with switch 46 "out" allows parity error signals to pass to terminal 56 during Read Enable only. Thus, a parity error will stop processing only during read.

Operation with switch 46 in position B allows parity error signals to pass to terminal 56 during both Read Enable and Write Enable.

Placing switch 46 in position C enables gate 50 and inhibits gate 35 due to Inverter-Amplifier 54. Operation in this position allows parity error signals to pass to terminal 56 only during Write Enable.

Position C of diagnostic switch 46 is particularly useful when trouble symptoms indicate that a specific memory location is being accessed and its contents changed erroneously. In order to determine when during a program this occurs, a word is inserted in the specific memory location with a complemented parity (diagnostic switch 46 in Position A). Switch 46 is then placed in position C and the program is run. Now the word inserted with false parity can be read any number of times as required by the program without stopping operation. Only when the specific memory location is accessed for Write will the false parity be recognized and the processing halted. The point in the program at which the halt occurs can usually be readily established either by counters that count the progress of the program or by the data transformations that have occurred.

Still a third aspect of the invention in the embodiment of FIG. 2 is implemented by switch 60, AND gate 61 and AND gate 62. Gates 61 and 62 each have two input terminals one of which is connected in each case to the output terminal of OR gate 55 and the other of which is connected to a respective switch terminal of switch 60. Thus, the other terminal of gate 61 is connected to first terminal X of switch 60 and the other terminal of gate 62 is connected to second terminal Y of switch 60. Switch 60 is operable to alternatively connect terminals X and Y to enable source 64 for enabling the respective gates. The output terminal of gate 62 is connected to Halt Operation Terminal 56. The output terminal of gate 61 is connected to an output synchronization connector for supplying a synchronizing trigger to test equipment.

When switch 60 is in position Y, parity error signals passing through gate 55 are applied to halt operation circuitry by gate 62. When switch 60 is in position X, parity error signals passing through gate 55 are applied to the synchronization output connector by gate 61.

An example of the use of switch 60 is when faulty operation occurs someplace in the data processing circuitry associated with cycling of some particular memory locations or with certain data being processed in or out of memory locations. A memory loop is set up that produces the faulty operation and then by use of switch 46 the parity bit of a word in memory is complemented. The memory location of this word is selected inside the memory loop at a point establishing a good time reference for synchronizing test equipment. For example, this may be to trigger the sweep of an oscilloscope on a word near the end of the loop so that electrical conditions occurring at the beginning of the loop cycle can be observed.

The various diagnostic tests that can be conducted in accordance with the inventive concepts are quite varied and extensive. They are only touched on in the above description. It will be recognized that the use of a complemented parity bit for diagnostic purposes is a main feature of the invention. The other described aspects are novel methods and implementations for making use of the complemented parity bit.

The specific implementations described are only by way of example. The actual switching and gating arrangements would naturally vary from one data processor to another and the false parity signals can readily be implemented for additional diagnostic or test purposes beyond those specified. Thus, it is intended to cover the invention broadly within the spirit and scope of the appended claims.

I claim:

1. A digital system comprising a memory store having a plurality of addressable word storage locations; means to read a word from an addressed location during a read mode; means to write a word into an addressed location during a write mode; a parity generator for providing a parity bit with a word written in; a parity checker for checking the parity of a word addressed; and the combination with said parity generator of means to selectively complement the parity bit provided with a word into an addressed location.

2. A digital memory system comprising a memory store having a plurality of addressable word storage locations; means to read a word from an addressed location during a read mode; means to write a word into an addressed location during a write mode; a parity generator for providing a parity bit with a word written in; a parity checker for checking the parity of a word read out; means associated with said parity generator to selectively complement the parity bit provided with a word written into an addressed location and means associated with said parity checker for signalling that a word with a complemented parity bit is accessed.

3. A digital memory system according to claim 2 in which said means associated with said parity checker for signalling the complemented parity bit comprises means for selectively signalling the complemented parity bit only during a write mode of operation.

4. A memory system according to claim 2 in which said means associated with said parity checker for signalling the complemented parity comprises means to signal the complemented parity during only a selected one of the following operational conditions:

1. a read mode of operation;
2. a write mode of operation; and
3. both write and read modes of operation.

5. A digital memory system according to claim 4 in which selection of the conditions under which the complemented parity bit is signalled is provided by a manually operated selector switch.

6. A digital memory system according to claim 2 in which said means to selectively complement the parity bit comprises a manually operable selector switch connected to switch an electrical inverter in and out of the output path of said parity generator.

7. A digital memory system according to claim 2 in which said means associated with said parity checker for signalling the complemented parity bit is connected to means for halting the operation of said memory system.

8. An electronic data processing system comprising a memory for storing data words consisting of digital bits; means to write data words into said memory; means to read data words from said memory; a parity generator for adding parity bits to data words written into said memory; a parity checker for checking parity bits of data words read out from said memory; and means to selectively complement the parity added to a data word from said parity generator and provide a faulty parity detectable by said parity checker.

9. An electronic data processing system according to claim 8 in which the output of said parity checker is connected to a means for applying a signal to circuitry that will halt the operation of said data processing system.

10. An electronic data processing system according to claim 8 in which the output of said parity checker is connected to an output connector terminal adapted to apply a synchronizing trigger output for use with diagnostic test equipment.

11. An electronic data processing system according to claim 8 in which the output of said parity checker is selectively connected to one of:

1. means to apply the signal from said parity checker to circuitry for halting the operation of said processing system; and
2. an output connection terminal for connecting the output of said parity checker as a synchronizing trigger to test equipment for use in analyzing the electrical operation of said data processing system.

12. An electronic data processing system according to claim 11 in which selection of the output connections for said parity checker is made by a manually operable switch.